US007849762B2

(12) United States Patent
Viola

(10) Patent No.: US 7,849,762 B2
(45) Date of Patent: Dec. 14, 2010

(54) CONSTRAINED TRI-SPHERE KINEMATIC POSITIONING SYSTEM

(76) Inventor: Robert J Viola, P.O. Box 10520, Jackson, WY (US) 83002

( * ) Notice: Subject to any disclaimer, the term of this patent is extended or adjusted under 35 U.S.C. 154(b) by 399 days.

(21) Appl. No.: 11/960,307

(22) Filed: Dec. 19, 2007

(65) Prior Publication Data

US 2009/0158879 A1 Jun. 25, 2009

(51) Int. Cl.
*B25J 17/00* (2006.01)

(52) U.S. Cl. ...................... 74/490.08; 403/61; 403/122; 74/471 XY; 254/134

(58) Field of Classification Search ............. 74/490.01, 74/490.07, 490.08, 471 XY; 254/133 R, 254/134; 403/82, 331, 61, 122; 414/589, 414/590

See application file for complete search history.

(56) References Cited

U.S. PATENT DOCUMENTS

| | | | | |
|---|---|---|---|---|
| 3,215,391 | A * | 11/1965 | Storm | 248/396 |
| 5,263,382 | A | 11/1993 | Brooks | |
| 5,279,176 | A | 1/1994 | Tahmasebi | |
| 5,301,566 | A | 4/1994 | Tahmasebi | |
| 5,656,905 | A | 8/1997 | Tsai | |
| 5,678,944 | A | 10/1997 | Slocum | |
| 5,901,936 | A | 5/1999 | Bieg | |
| 6,186,480 | B1 * | 2/2001 | Leteurtre | 254/84 |
| 6,477,912 | B2 | 11/2002 | Song | |
| 6,484,602 | B1 | 11/2002 | Dagalakis | |
| 6,543,740 | B2 | 4/2003 | Gaunt | |
| 6,602,042 | B2 | 8/2003 | Roy | |
| 6,648,583 | B1 | 11/2003 | Roy | |
| 6,729,202 | B2 | 5/2004 | Gosselin | |
| 6,729,589 | B2 | 5/2004 | Shelef | |
| 6,840,127 | B2 | 1/2005 | Moran | |
| 7,093,827 | B2 | 8/2006 | Culpepper | |
| 2004/0013509 | A1 | 1/2004 | Roy | |

FOREIGN PATENT DOCUMENTS

| | | |
|---|---|---|
| WO | WO 2005/009693 | 2/2005 |
| WO | WO 2005009693 A1 * | 2/2005 |

OTHER PUBLICATIONS

An Automated Magnet Positioning System for Use in the Next Linear Collider, Department of Energy Report No. DOE-ER84078-SQR1, Feb. 21, 2006.

* cited by examiner

*Primary Examiner*—Richard W Ridley
*Assistant Examiner*—Terence Boes
(74) *Attorney, Agent, or Firm*—NUPAT, LLC; Morrison Ulman

(57) ABSTRACT

A scalable and adaptable, six-degree-of-freedom, kinematic positioning system is described. The system can position objects supported on top of, or suspended from, jacks comprising constrained joints. The system is compatible with extreme low temperature or high vacuum environments. When constant adjustment is not required a removable motor unit is available.

5 Claims, 11 Drawing Sheets

CONSTRAINED TRI-SPHERE KINEMATIC POSITIONING SYSTEM

GOVERNMENT RIGHTS

Parts of this invention were made with U.S. Government support under contract DE-FG02-04ER84078 awarded by the Department of Energy. The Government has certain rights in the invention.

TECHNICAL FIELD

The disclosure is generally related to multiple-degrees-of-freedom positioning systems.

BACKGROUND

High-payload, high-precision, six-degree-of-freedom, positioning systems are useful for diverse tasks ranging from sub-micron manipulation of semiconductor photo-masks during electron beam patterning to active position adjustment of multi-ton jet engines during aircraft manufacturing.

One of the most widely used positioning systems is the strut array. Strut arrays belong to a class of manipulators known as Stewart mechanisms and are versatile and inexpensive. When properly arranged, they have the advantage of being kinematic, meaning that they allow the position of an object being supported to be adjusted in all six degrees of freedom (x, y, z, pitch, roll and yaw) without over constraining the object. Unlike positioning mechanisms assembled from linear stages, strut arrays are not orthogonal: pure translations require that the lengths of all of the struts be adjusted. If absolute alignment tolerances are relatively loose, this actuator coupling, manifested as small cosine errors, is not generally significant. However, strut arrays are often limited in translational range of motion.

A new system called a "tri-sphere" was introduced recently [See "An Automated Magnet Positioning System for Use in the Next Linear Collider", R. J. Viola, Department of Energy Report No. DOE-ER84078-SQR1, incorporated herein by reference.] In a trisphere system, three jacks provide support for an object being manipulated. Each jack is adjustable in two out of three orthogonal (or nearly orthogonal) directions and free in the third direction. For example, a system may be constructed in which three jacks are arranged in a triangle. Each jack includes vertical (z-direction) adjustment. Successive jacks are adjustable in one lateral (x or y) direction and free in the other and one of the jacks is rotated 90 degrees relative to its neighbors according to Table 1.

TABLE 1

Orientation of actuated and free (unconstrained) axes in a tri-sphere system.

| Jack # | x-movement | y-movement | Orientation relative to Jack #1 |
|---|---|---|---|
| 1 | Free | Actuated | — |
| 2 | Actuated | Free | Rotated 90 degrees |
| 3 | Free | Actuated | Parallel |

A tri-sphere system was created from commercial motion control components. Each jack mechanism comprised a traveling block, riding on a pair of linear bushings, driven in the horizontal plane by a motorized lead screw. A central ball screw, driven by a geared motor connected via a spline shaft, provided vertical adjustment. The central ball screw was topped by a steel contact sphere (hence the name "tri-sphere") that acted as the interface between the mechanism and the object being manipulated. The spheres engaged V-shaped grooves incorporated into the bottom of the object. The grooves were located at right angles to the lead screws that drove the traveling blocks. Because of the design's inherent compliance, the object did not have to be precisely located relative to the three support points when being installed. When lowered into a nominally correct location the object was snapped into place by gravity.

While quite successful for some applications, the conventional tri-sphere has limitations that render it unsuitable for other applications. For example, the conventional tri-sphere can only be used upright. In other words the jacks must support the object from the bottom. If the system were turned upside down the object would fall off. There are many applications such as manipulation of objects in a cryostat in which the object must be suspended from its manipulator. Unfortunately the conventional tri-sphere cannot be used in suspension mode.

The conventional tri-sphere is not compatible with high-vacuum and/or low-temperature scientific apparatus partially because its actuators are unusable in those situations. Ball screws and electric motors, for example, are not compatible with high-vacuum, low-temperature chambers.

Finally, there are several applications of positioning systems in which an object is initially positioned and subsequently not often adjusted or perhaps never adjusted again. The conventional tri-sphere may be used in these applications but it is needlessly expensive to employ precision actuator motors for only a single use.

What is needed is a six-degree-of-freedom positioning system that has the advantages of the tri-sphere yet is compatible with upside down, inverted or suspended orientations. Further, what is needed is an inverted positioning system that is compatible with high-vacuum and/or low-temperature apparatus. Finally, what is needed is a positioning system that includes the advantages of precise motor control without wasting expensive motors in single- or low-use applications.

BRIEF DESCRIPTION OF THE DRAWINGS

The drawings are heuristic for clarity.

DETAILED DESCRIPTION

Systems described herein facilitate the positioning of objects with adjustments possible in six degrees of freedom: x, y, z, pitch, roll, and yaw. These systems are flexible, scalable and kinematics for any configuration of the system there exists one and only one corresponding position in space for the object being supported.

Lightweight systems may be constructed to handle objects weighing as little as a few grams while heavier versions may handle objects as heavy as tens of thousands of kilograms. Similarly the systems described herein may be designed to move objects over just a few millionths of a meter or over several meters. Regardless of the particular implementation, however, the systems all share design principles. These principles represent a departure from the conventional tri-sphere concept and they enable previously impossible applications. We still refer to the new systems as "tri-sphere" systems for historical reasons even when no contact spheres are present.

The systems described herein incorporate constrained interfaces or joints between positioning mechanisms and an object to be manipulated. These constrained interfaces let the system operate in any orientation including upright, inverted, or sideways with respect to vertical. The constrained interfaces further provide low friction which enhances positioning precision and repeatability.

A particular embodiment of the systems described herein demonstrates compatibility with extreme low-temperature and/or extreme high-vacuum environments that are important, for example, in scientific experiments.

Further, systems are described in which actuation motors are detachable from actuation mechanisms. In these systems, portable motors may be applied to an actuator when needed and removed for use on other actuators at other times. These portable actuation units greatly reduce the expense of an installation requiring many positioning systems that only need occasional adjustment.

Figure 1:
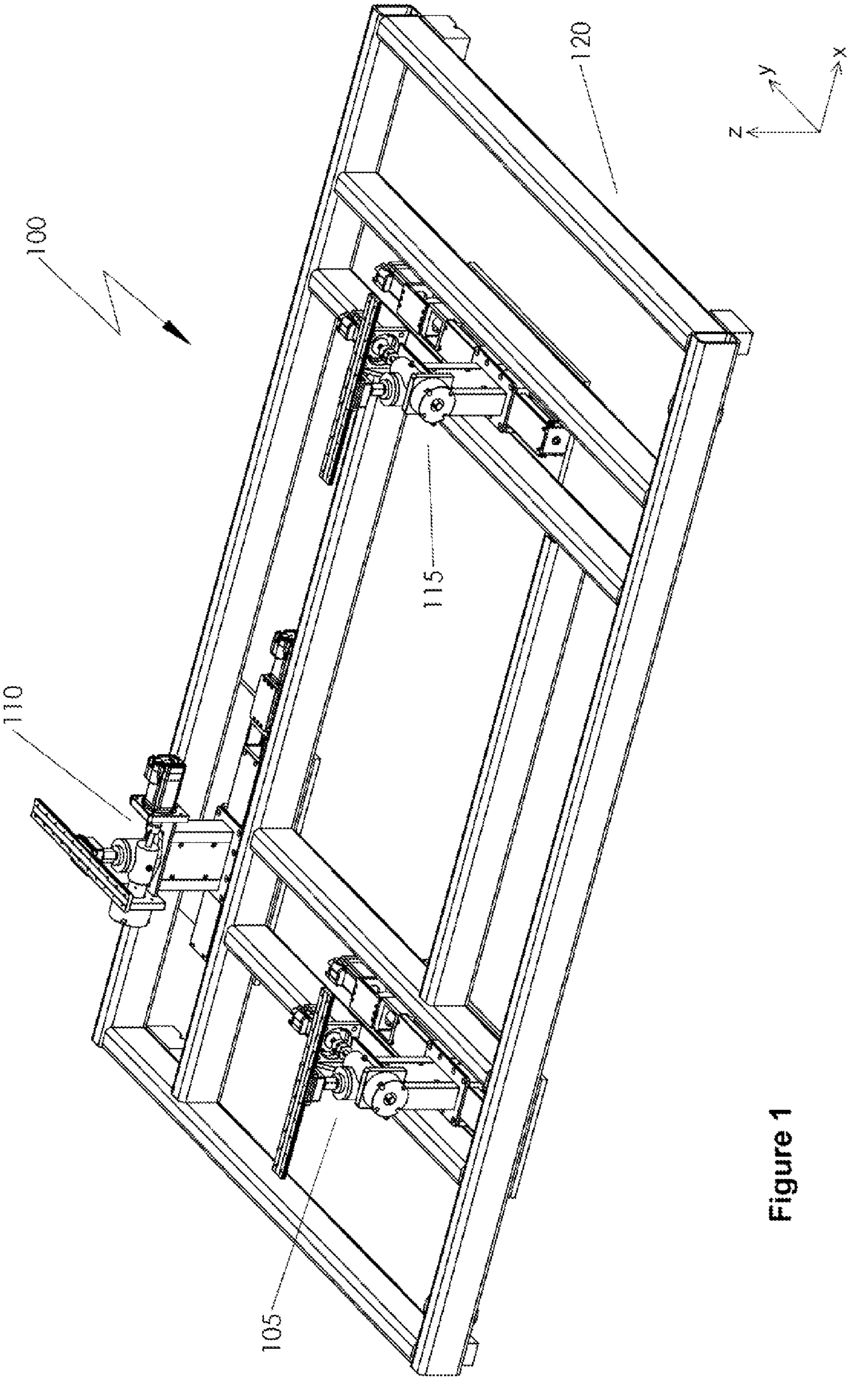
FIG. 1 shows a positioning system employing a tri-sphere apparatus.

FIG. 1 shows a positioning system employing a tri-sphere apparatus. (This system does not use contact spheres. "Tri-sphere" therefore refers to the arrangement of actuators in a triangle, each with actuated and free movement directions as summarized in Table 1.) In FIG. 1. a positioning system 100 comprises three jack mechanisms 105, 110, 115, mounted on an optional frame 120. Referring to the x-y-z axes accompanying the figure (x-y-z axes are provided in many of the figures for discussion purposes), jacks 105 and 115 provide support for an object (not shown) such that the object is free to move in the x-direction while the jacks actively move it in the y-direction. Jack 110 provides support for the object such that the object is free to move in the y-direction while jack 110 actively moves it in the x-direction. All three jacks actively move in the z-direction.

Translations of an object in the z-direction are accomplished by actuating the z-axis motion of the three jacks simultaneously. Translations in the x-direction are accomplished by actuating the x-axis movement of jack 110 while jacks 105 and 115 allow the object to move freely along the x-axis. Translations in the y-direction are accomplished by actuating the y-axis movement of jacks 105 and 115 while jack 110 allows the object to move freely along the y-axis.

Rotation around the z-axis accomplished through combinations of x and y translations of the three jacks. Rotations around the x- and y-axes are accomplished through combinations of z-axis movements of the three jacks. Thus movement through six degrees of freedom, x, y, z, and rotations about each of those axes (pitch, roll, and yaw), is possible.

The details of frame 120 are unimportant. Its function is to fix the bases of the jacks and to bear their weight and that of the object being moved. The scale of positioning system 100 is unspecified and unlimited it can be built to accommodate objects of just a few kilograms to as many as tens of thousands of kilograms depending on the components used.

Figure 2:
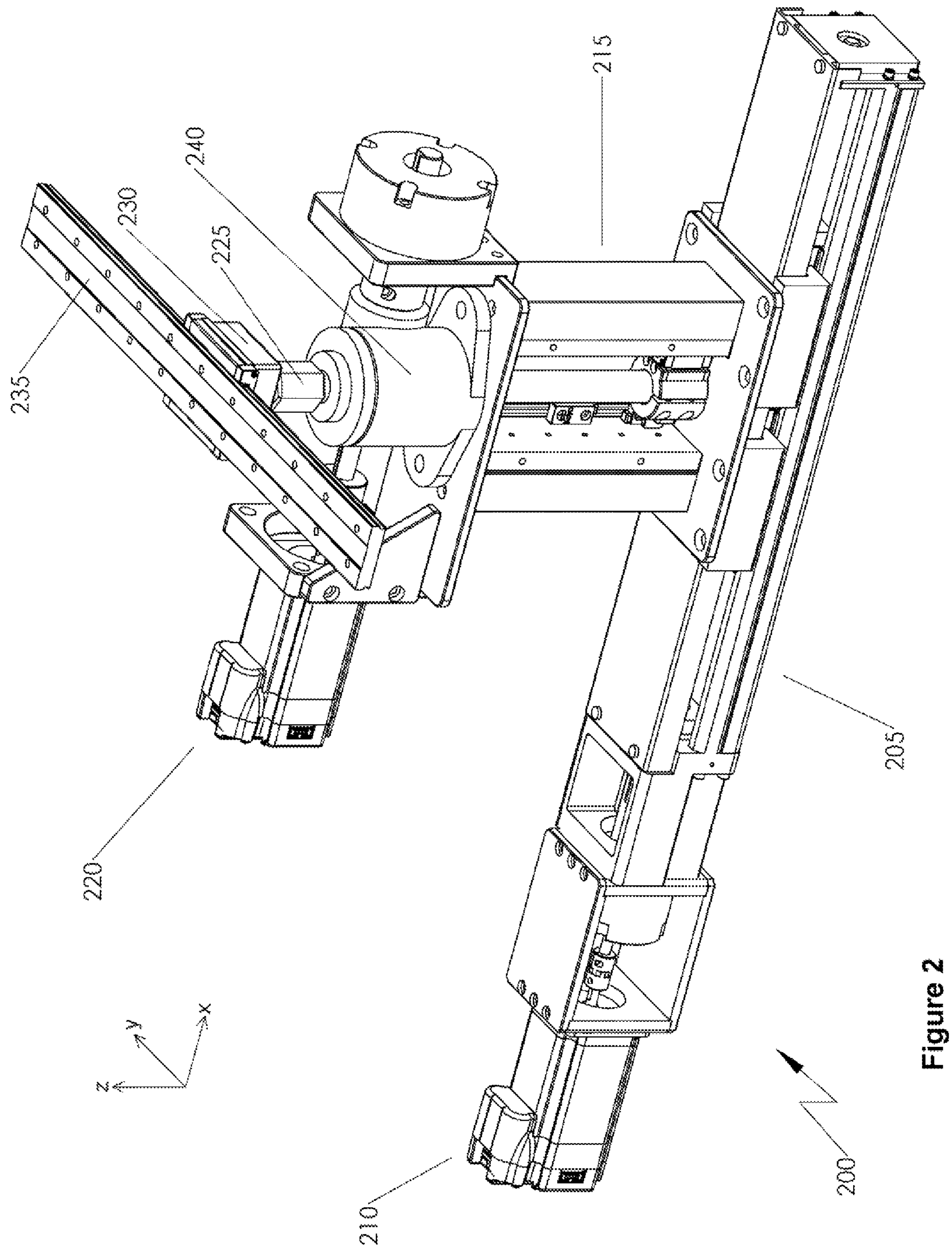
FIG. 2 shows a detailed view of one of the mechanisms of the system of FIG. 1.

FIG. 2 shows a detailed view of one of the mechanisms of the system of FIG. 1. Mechanism 200 could be any of jacks 105, 110 or 115 in FIG. 1. In FIG. 2, horizontal actuator 205 is driven by motor 210; vertical actuator 215 comprises motor 220, gear box 240, and constrained joint 225. Constrained joint 225 is connected to slide 230 which slides on rail 235. Finally, worm gear box 240 translates the movement of motor 220 into z-direction movement of constrained joint 225.

Mechanism 200 is designed to support an object (not shown) on rail 235. The rail is free to slide in the y-direction through slide 230. Therefore, although mechanism 200 supports the weight of an object attached to rail 235, it does not prevent or constrain the movement of that object in the y-direction. At the same time, mechanism 200 does provide actuated movement of the object in the x-direction through horizontal actuator 205 which is driven by motor 210. Actuator 205 may be, for example, a linear translation stage driven by a lead screw. Motor 210 may be, for example, a precision stepper motor capable of hundreds or thousands of steps per revolution.

Mechanism 200 provides actuated movement in the vertical or z-direction via vertical actuator 215 which comprises motor 220 which drives worm gear box 240. When motor 220 turns, gear box 240 causes constrained joint 225 to move in the z-direction. Motor 220 may be, for example, a precision stepper motor capable of hundreds or thousands of steps per revolution. Constrained joint 225 allows a limited range of angular motion but does not allow linear extension or contraction in the z-direction. Further detail on constrained joint 225 is provided in connection with FIGS. 3 and 4.

Figure 3:
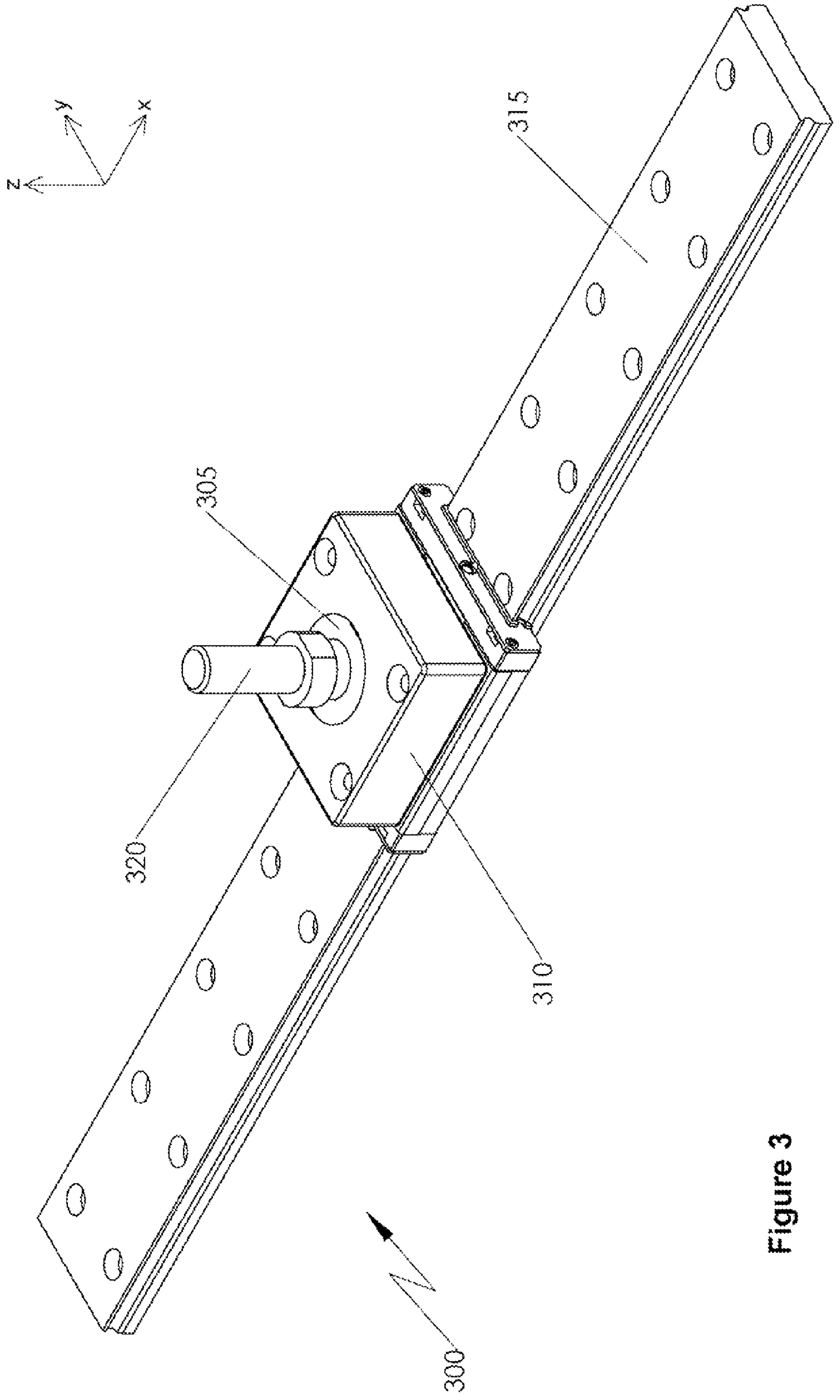
FIG. 3 shows a constrained, sliding joint comprising a slide on a rail and a ball joint.

FIG. 3 shows a constrained, sliding joint 300 comprising a slide on a rail and a ball joint. In FIG. 3, slide 310 slides on rail 315. Constrained joint 305 connects slide 310 to shaft 320. Corresponding components in FIG. 2 include constrained joint 225, slide 230, rail 235. The component in FIG. 2 corresponding to shaft 320 is not called out explicitly, but it is the part in FIG. 2 that connects the constrained joint to gear box 240.

Mechanism 300 provides a connection between an object (not shown) attached to rail 315 and shaft 320. For purposes of discussion only of the motion of mechanism 300, consider for a moment rail 315 as fixed. Slide 310 is free to move in the x-direction, but prevented from moving in the y-direction. Constrained joint 305 permits small angular motions of shaft 320 but prevents motion in the z-direction. Joint 305 can withstand tension or compression in the z-direction.

Figure 4:
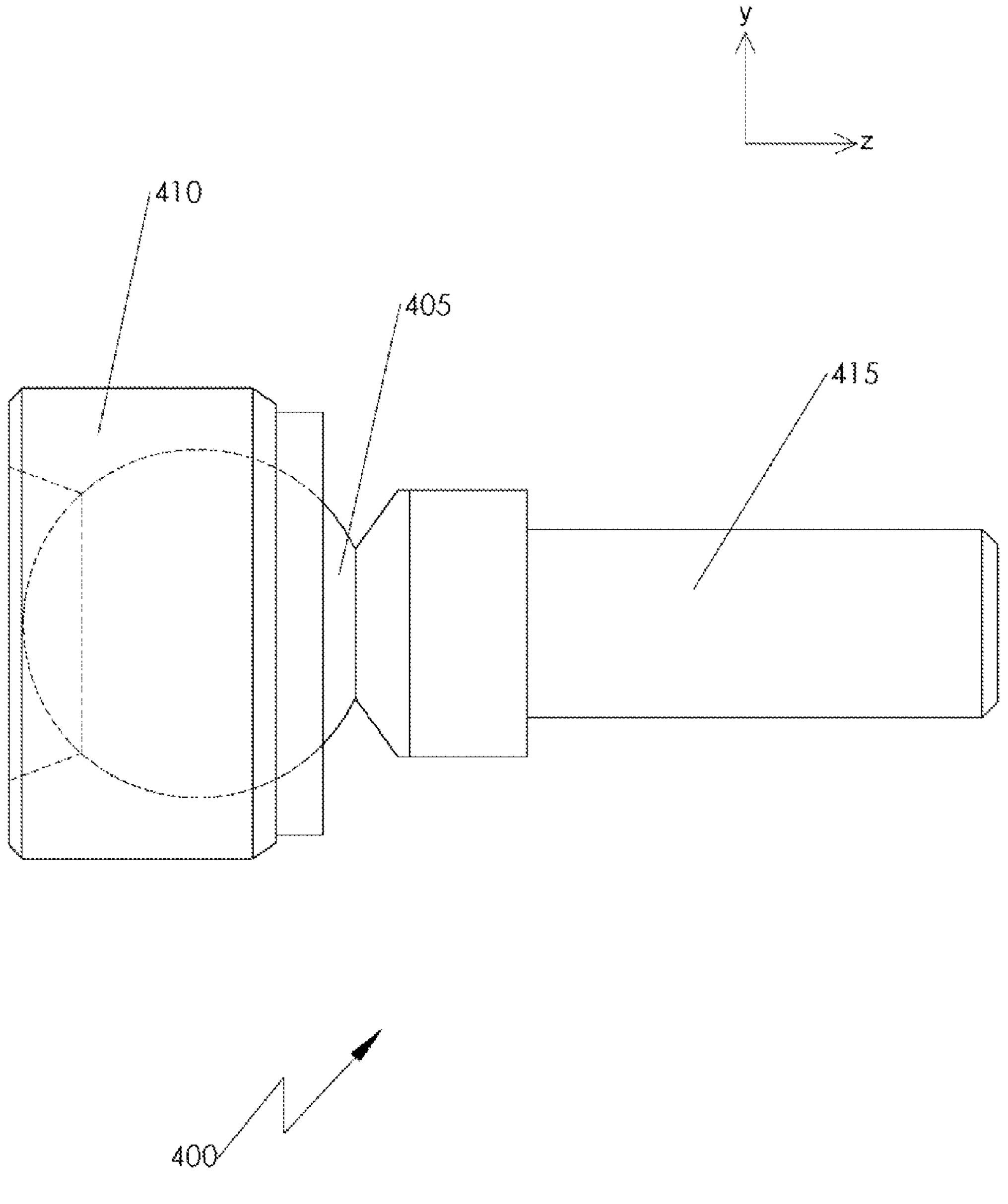
FIG. 4 shows a ball joint.

FIG. 4 shows a ball joint 400 which is one possible realization of constrained joint 305 or 225. An alternate realization of the constrained joint is a universal coupling. In FIG. 4, ball 405 is fixed to shaft 415. Ball 405 further lies in, and is constrained in, socket 410. This arrangement allows socket 410 to move through small rotations around the center of ball 405. For example, socket 410 may move through small rotations around either the x- or y-axes and may rotate freely around the axis of shaft 415. Shaft 415 corresponds to shaft 320 in FIG. 3, while socket 410 is the part of constrained joint 305 that is fixed to slide 310.

Compared to a conventional tri-sphere system, the constrained joints of positioning system 100 enable previously impossible applications. Once an object is attached to the slides of jacks 105, 110, 115, the constrained joints in the jacks allow the system to operate upright (i.e. z-axis up), sideways (z-axis horizontal), inverted (z-axis down) or any other orientation. Further, the rail and slide mechanisms in the jacks offer reduced function which leads to greater positioning precision and repeatability compared to conventional systems. System 100 is but one embodiment of a tri-sphere system employing constrained interfaces or joints. Another example is given in FIG. 5 which shows an inverted positioning system employing a tri-sphere apparatus with constrained joints and piezoelectric actuators.

Conventional motors, rails, slides and ball joints are not compatible with extreme environments such as the conditions found in low temperature and/or high vacuum experimental science apparatus. Therefore an alternate embodiment of the tri-sphere positioning system with constrained joints has been developed. Positioning system 500 shown in FIG. 5 is designed for low temperature or high vacuum operation, or both.

Figure 5:
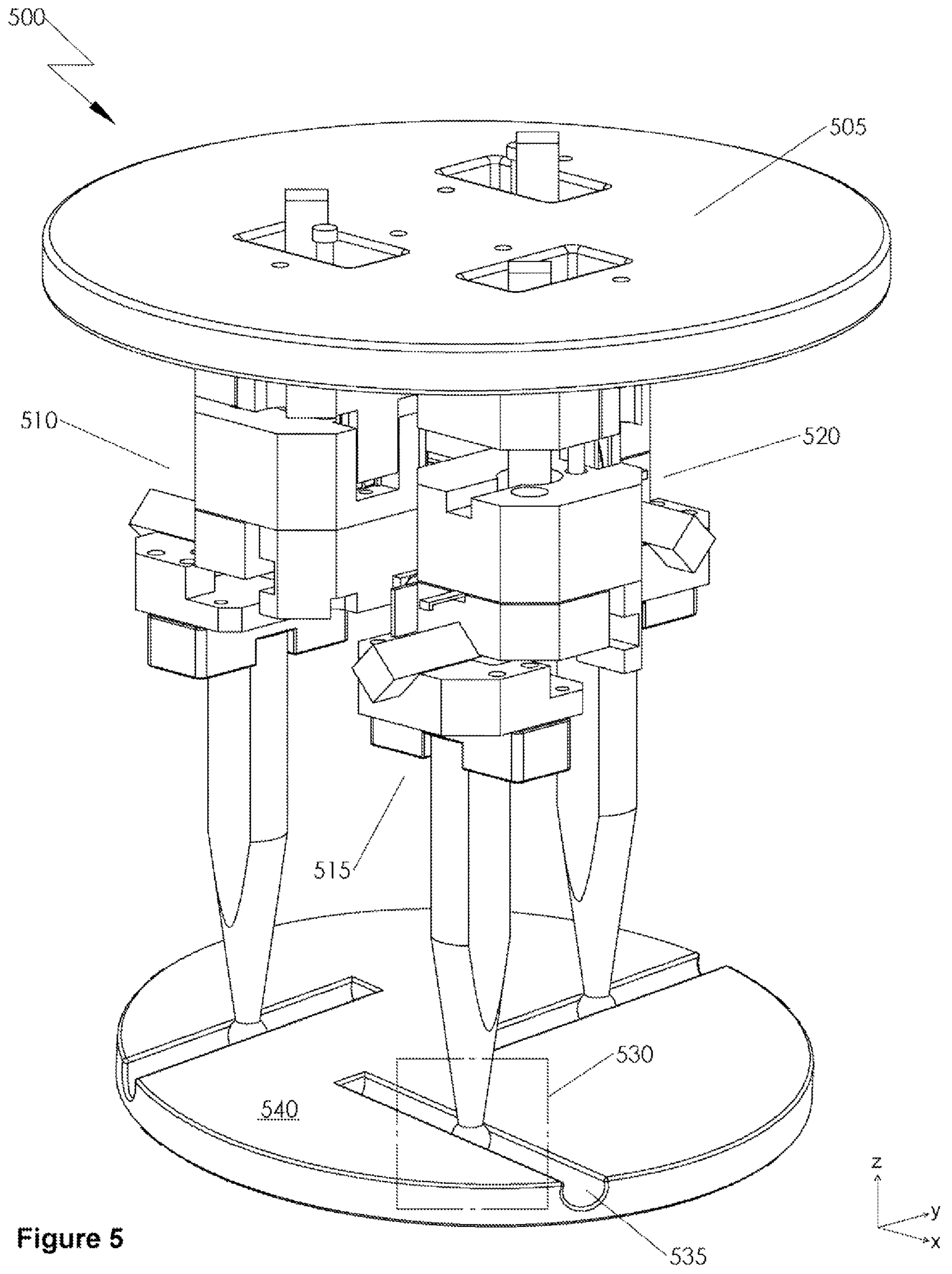
FIG. 5 shows an inverted positioning system employing a tri-sphere apparatus with constrained joints and piezoelectric actuators.

In FIG. 5, base 505 supports jacks 510, 515, 520. The jacks are connected to object plate 540 through constrained joints, one of which is called out by dotted box 530. In this design, ball ends sliding in slots, such as slot 535, perform the function of the constrained sliding joint illustrated in FIG. 3. For sake of discussion, consider base 505 to be fixed in space. Then, jacks 510, 515, and 520 manipulate object plate 540 through six degrees of freedom: x, y, z, and rotations about each of those axes (pitch, roll, and yaw). Positioning system 500 is particularly suited to inverted applications in which base 505 is above object plate 540, as shown in the figure. A example use is to fix base 505 to a flange on a vacuum system such that object plate 540, and apparatus attached to it, hang in a cryogenic dewar.

Figure 6:
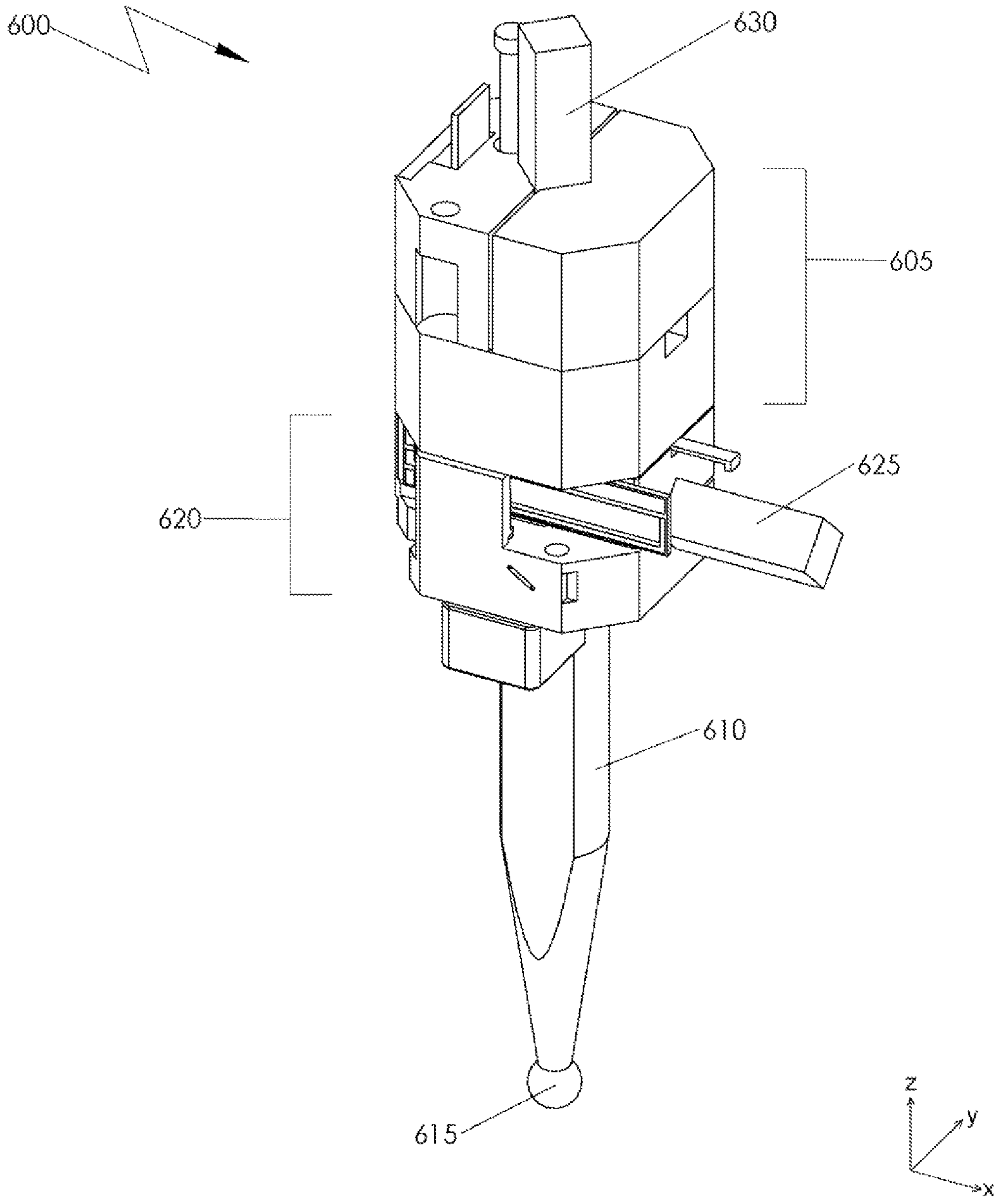
FIG. 6 shows a detailed view of one of the mechanisms of FIG. 5.

FIG. 6 shows a detailed view of one of the jack mechanisms (510, 515, 520) of FIG. 5. In FIG. 6, piezoelectric motors 605, 620 move along shafts 630 and 625. Shaft 610 is terminated by ball end 615 which fits in a slot, such as slot 535 of FIG. 5.

Piezoelectric motor 605 may be an inchworm, clamp-and-release, or inertial design. In other words a piezoelectric motor combines the functions of the stepper motor and the linear translation stage in the design of FIG. 2. Motor 605's function is to move in the z-direction along shaft 630. Similarly, piezoelectric motor 620 provides movement in the x-direction. (One can see a different position of motor 620 by inspection of jack 515 in FIG. 5. In that case the motor is oriented along the y-axis and has moved enough that a split between the halves of the motor is visible.) Finally, shaft 610 is connected to the bottom of motor 620.

The design shown in FIGS. 5 and 6 retains the orthogonal free and actuated movements of the tri-sphere system summarized in Table 1. It also comprises a new form of the actuated joint of FIG. 3. It is compatible with suspended-from-above operation and its components are compatible with both low temperature and high vacuum environments.

Adjusting the position of magnets in a linear collider for high-energy physics experiments is one example of an application in which many tri-sphere systems are required. However, in that application, and many others, it is not necessary to have adjustment capability continuously available. Rather, a "set it and forget it" approach is more appropriate. In such a situation, equipping each tri-sphere jack with dedicated precision motors is unnecessarily expensive. To solve this problem, a tri-sphere positioning system with detachable motors has been developed.

Figure 7:
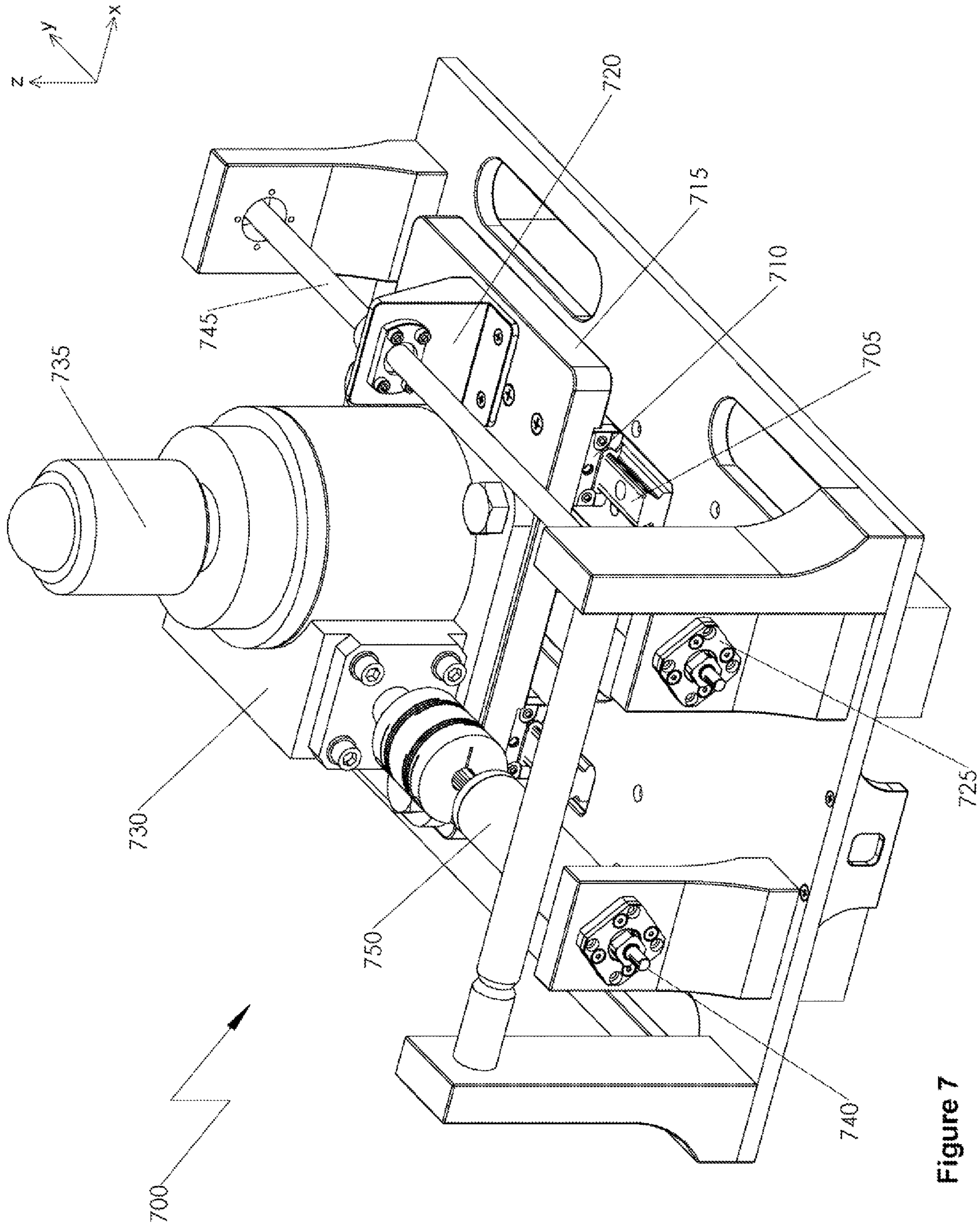
FIG. 7 shows a mechanism for a heavy duty tri-sphere apparatus with detachable motors removed.

FIG. 7 shows a mechanism for a heavy duty tri-sphere apparatus 700 with detachable motors (not shown) removed. In FIG. 7, a positioning jack comprises plate 715 which is attached to slides riding on rails, such as slide 710 riding on rail 705. Plate 715 moves in the y-direction in response to lead screw 745 which is threaded in nut 720. Nut 720 is fixed to plate 715. Also fixed to plate 715 is worm gear box 730 which extends or retracts actuator 735 in the z-direction. Actuator 735 may comprise a contact sphere or a constrained joint, depending upon the application. Shaft 750 is splined to transfer torque from shaft end 740 to gear box 730 while permitting plate 715 to slide in the y-direction. Apparatus 700 does not include motors. Instead shaft ends 725 and 740 are made available for temporary attachment of portable motors.

Figure 8:
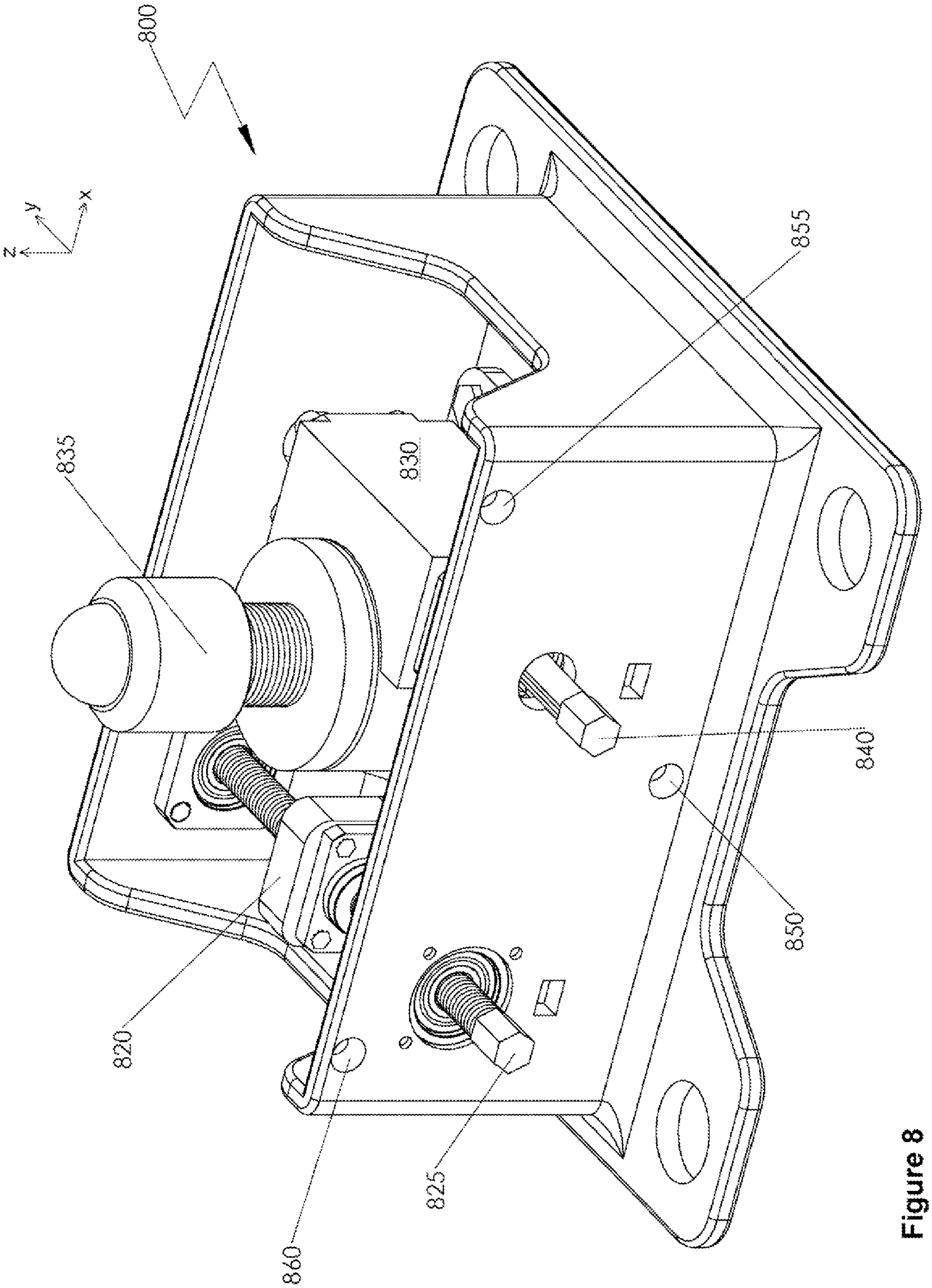
FIG. 8 shows an alternate mechanism for a heavy duty tri-sphere apparatus with detachable motors removed.

FIG. 8 shows an alternate mechanism for a heavy duty tri-sphere apparatus 800 with detachable motors (not shown) removed. In FIG. 8, contact sphere 835 is adjustable in the y and z directions. Y-direction adjustment is made by turning shaft end 825 which moves a lead screw through nut 820. Z-direction adjustment is made by turning shaft end 840 which drives worm gear box 830. Guide holes 850, 855, 860 are used to align a portable motor unit (not shown) to apparatus 800.

Figure 9:
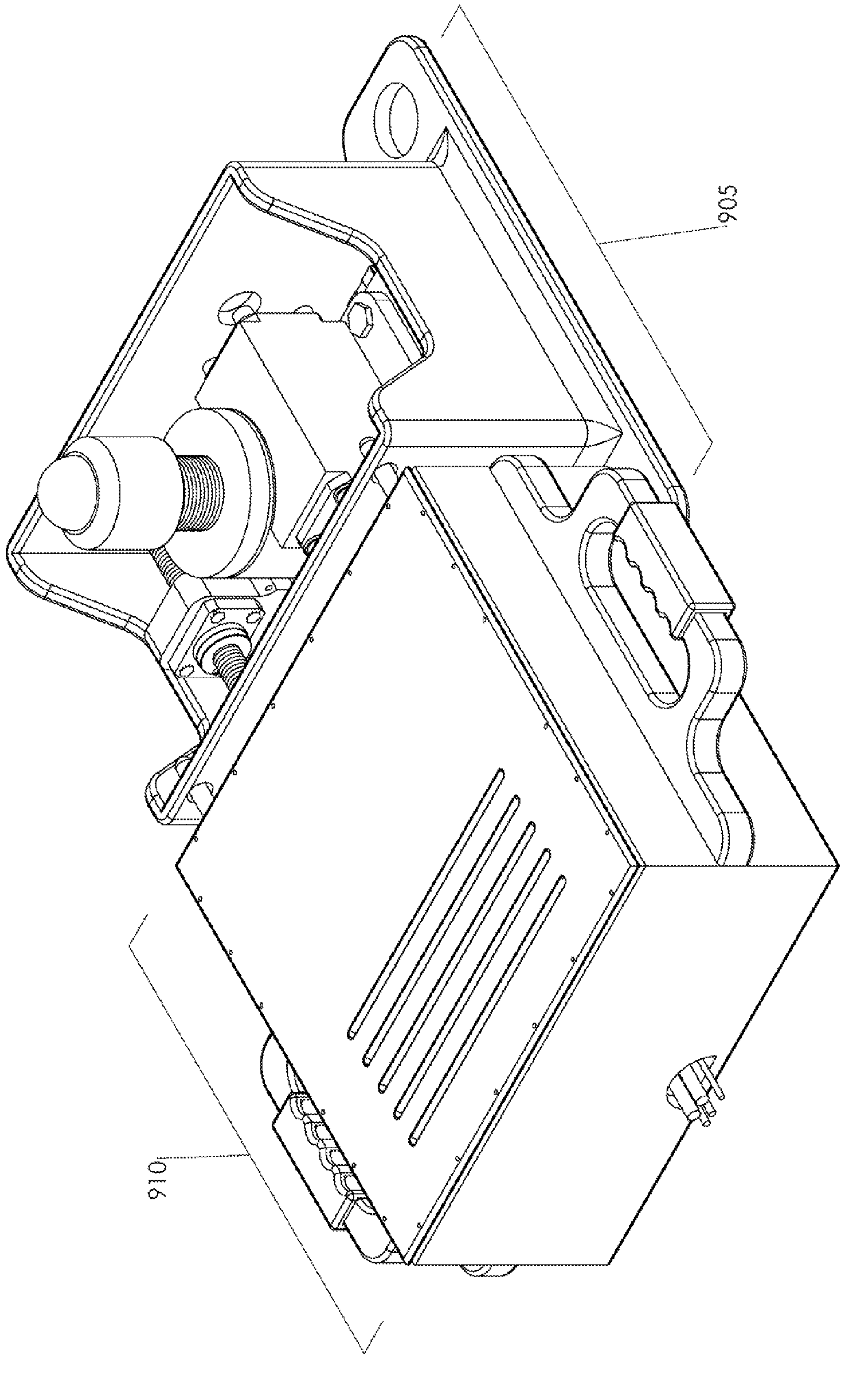
FIG. 9 shows the mechanism of FIG. 8 coupled to a portable motor unit.

FIG. 9 shows the mechanism of FIG. 8 (item 905) coupled to a portable actuation motor unit 910. Portable motor unit 910 may be attached to an appropriately designed tri-sphere jack whenever adjustment of the jack is needed. Once the jack has been adjusted, the portable motor unit can be removed and used to adjust other jacks in the system. For certain applications that do not require frequent repositioning of an object, one or just a few portable motor units can serve dozens or even hundreds of jacks. The portable motor unit may be built with a power cord for connection to utility power, or in lightweight applications, it may contain its own battery power source.

Figure 10:
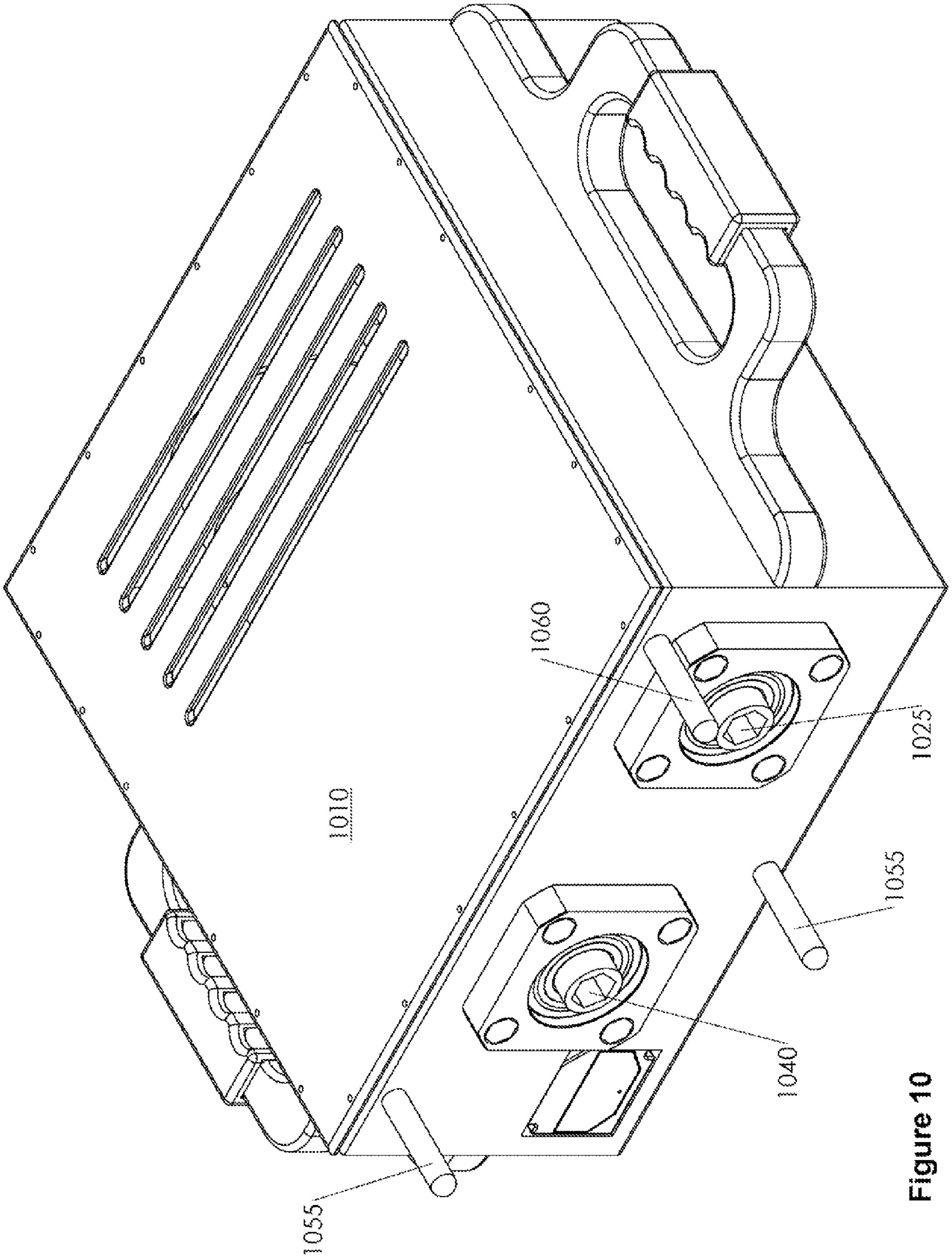
FIG. 10 shows the portable motor unit of FIG. 9 in greater detail.

FIG. 10 shows the portable actuation motor unit of FIG. 9 in greater detail. Motor unit 1010 comprises two motors (not visible in this figure) that drive shaft couplers 1025 and 1040. The motor unit also includes alignment pins 1050, 1055, and 1060. It may be appreciated by inspection of FIGS. 8-11 that when portable motor unit 1010 is mated to tri-sphere mechanism 800, alignment pins 1050, 1055, and 1060 fit into guide holes 850, 855 and 860, respectively. Similarly, shaft couplers 1025 and 1040 engage shaft ends 825 and 840, respectively.

Figure 11:
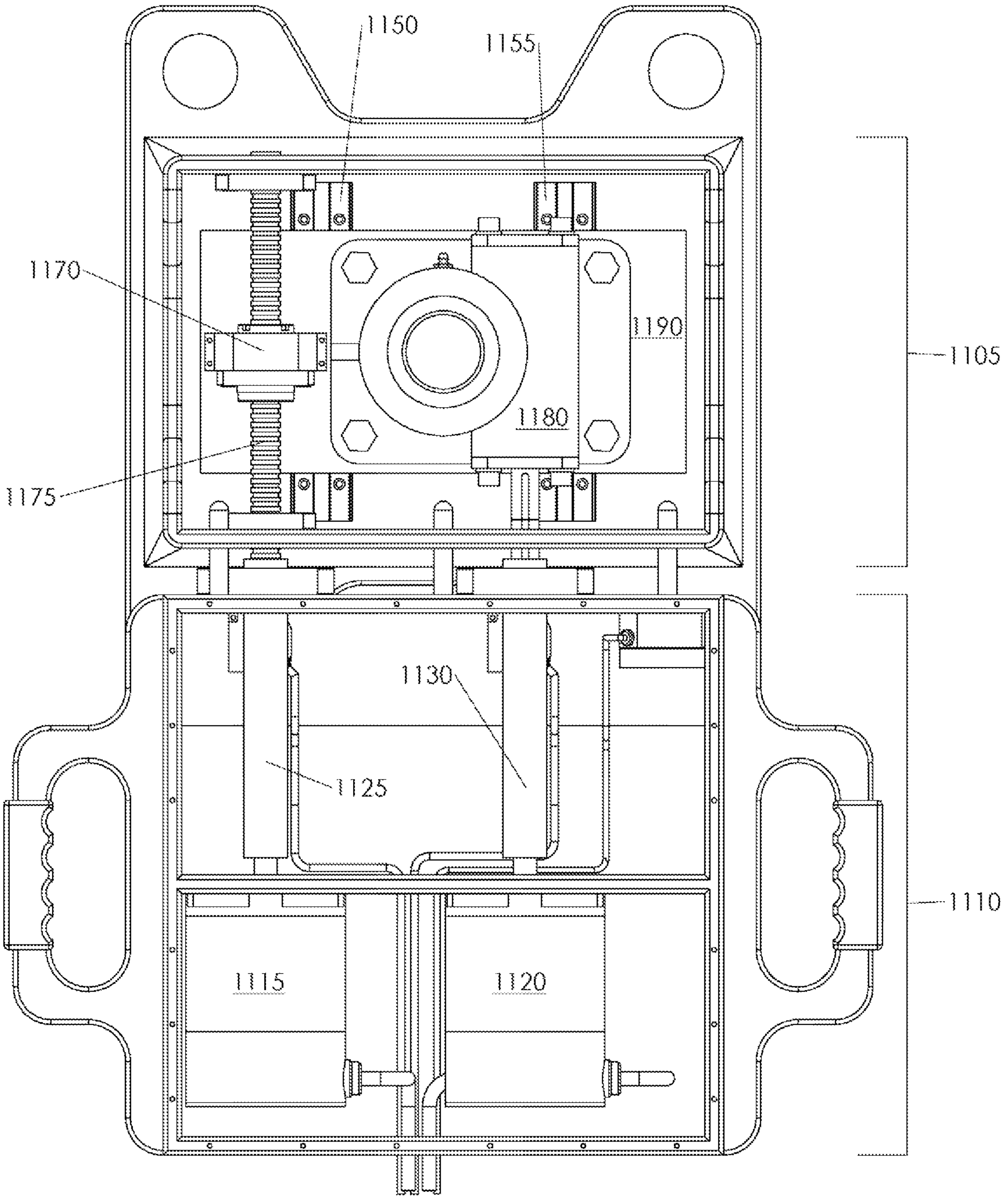
FIG. 11 shows a detailed view of the portable motor unit of FIG. 10 coupled to the mechanism of FIG. 8.

FIG. 11 shows a detailed view of the portable actuation motor unit of FIG. 10 coupled to the mechanism of FIG. 8. In FIG. 11 tri-sphere jack 1105 is mated to portable motor unit 1110. Within tri-sphere jack 1105, plate 1190 rides on rails 1150, 1155. Connected to, and supported by, plate 1190 are worm gear box 1180 and lead screw nut 1170. Lead screw 1175 engages nut 1170 to move plate 1190 along rails 1150 and 1155. Motors 1115 and 1120 drive shafts 1125 and 1130 which in turn drive lead screw 1175 and worm gear box 1180 respectively through connections such as those described in connection with FIGS. 8-10.

A convenient design feature of the tri-sphere jack/portable motor unit combination described above is that the motor drive shafts (e.g. 1125, 1130) are parallel to one another. Were it not so, connecting the portable motor unit to the tri-sphere jack would become far more complex.

A scalable and adaptable, six-degree-of-freedom, kinematic positioning system has been described. The system can position objects supported on top of, or suspended from, jacks comprising constrained joints. The system is further flexible in that it may be designed for compatibility with extreme low temperature or high vacuum environments. Finally, for situations where constant adjustment is not required, a removable motor unit has been described. The removable motor unit is applicable both to tri-sphere systems with constrained joints and to conventional tri-sphere systems.

Those skilled in the art will readily appreciate that although axes, actuated motions, and free motions of various mechanisms have been described as "orthogonal" the mechanisms will also work if their axes, actuated motions, and free motions are not exactly orthogonal to one another. For examples systems similar to those described above, but with two or more axes oriented as much as fifteen or twenty degrees closer together than perpendicular, will work in substantially the same way as the systems described herein.

Although the embodiments described above are actuated by either motor-driven ball screws or piezo-electric motors, other actuator options exist. For example, linear motors, rack-and-pinion drives or other technologies capable of generating linear motion may be used as actuators. Further, the interface between a jack's vertical actuator and top slide may be a ball joint, Hook's joint, or other mechanical joint that allows unrestricted rotation while constraining translations. Finally, unconstrained horizontal axes may be implemented using linear slides, low-friction grooves, air bearings, magnetic bearings, or similar mechanisms.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A six-degree-of-freedom positioning system comprising:

three jacks, each actuated in two orthogonal directions and free in a third orthogonal direction; and, constrained interfaces attached to each jack that form a connection between each jack and an object to be manipulated, wherein, the free directions of a first and a second of said three jacks are parallel to each other while the free direction of the third jack is perpendicular to the free direction of the first and second jacks, said constrained interfaces prevent said jacks from separating from the object, and said constrained interfaces comprise ball-and-socket joints and slide-on-rail mechanisms.

2. The positioning system of claim 1 further comprising actuator motors that actuate said jacks.

3. The positioning system of claim 2 wherein said actuator motors are precision stepper motors.

4. The positioning system of claim 2 wherein said actuator motors are removable from said jacks.

5. The positioning system of claim 4 wherein said removable actuator motors are contained in a portable motor unit comprising motor drive shafts that are parallel to one another.

* * * * *